Patented Apr. 17, 1928.

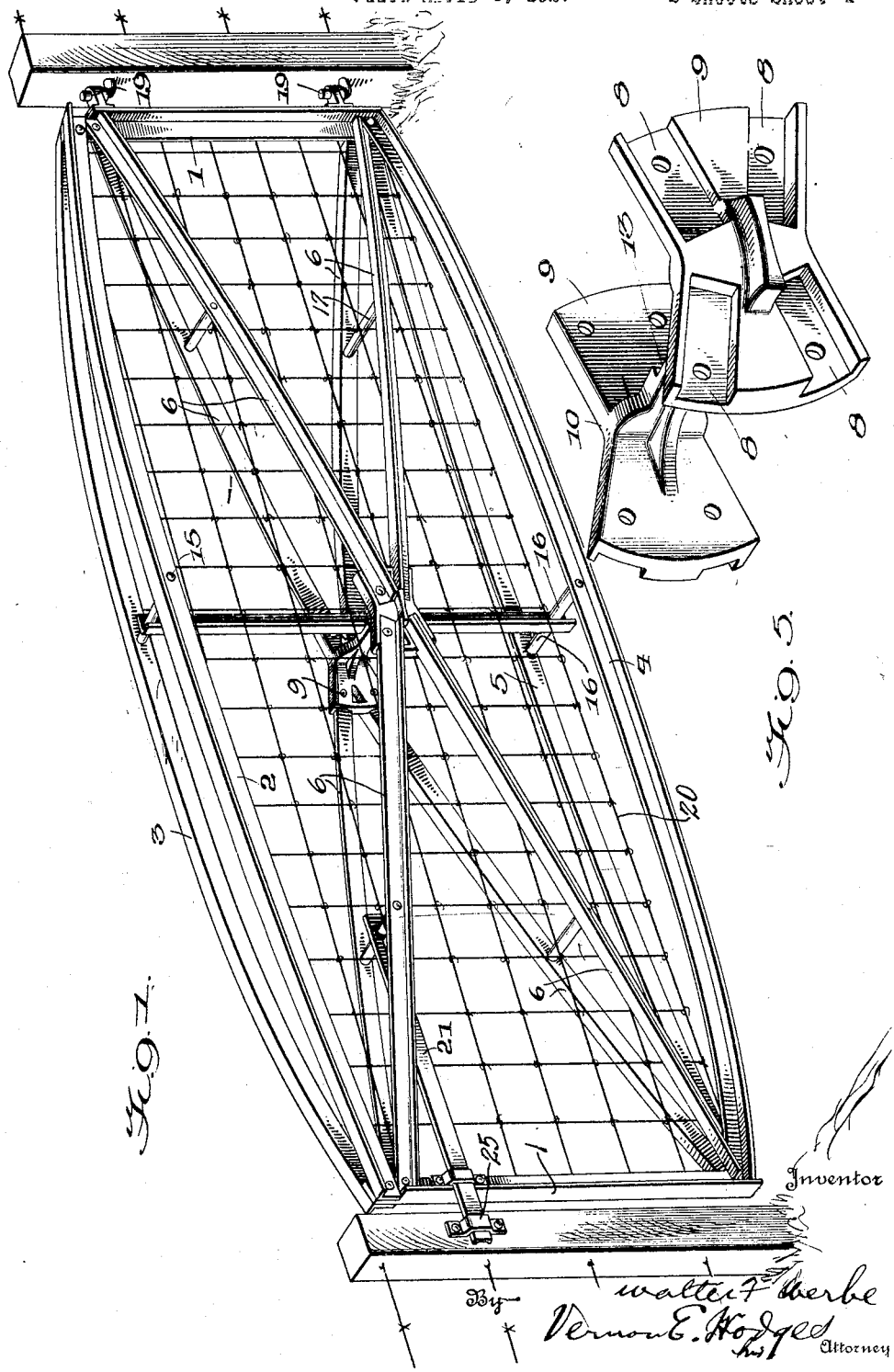

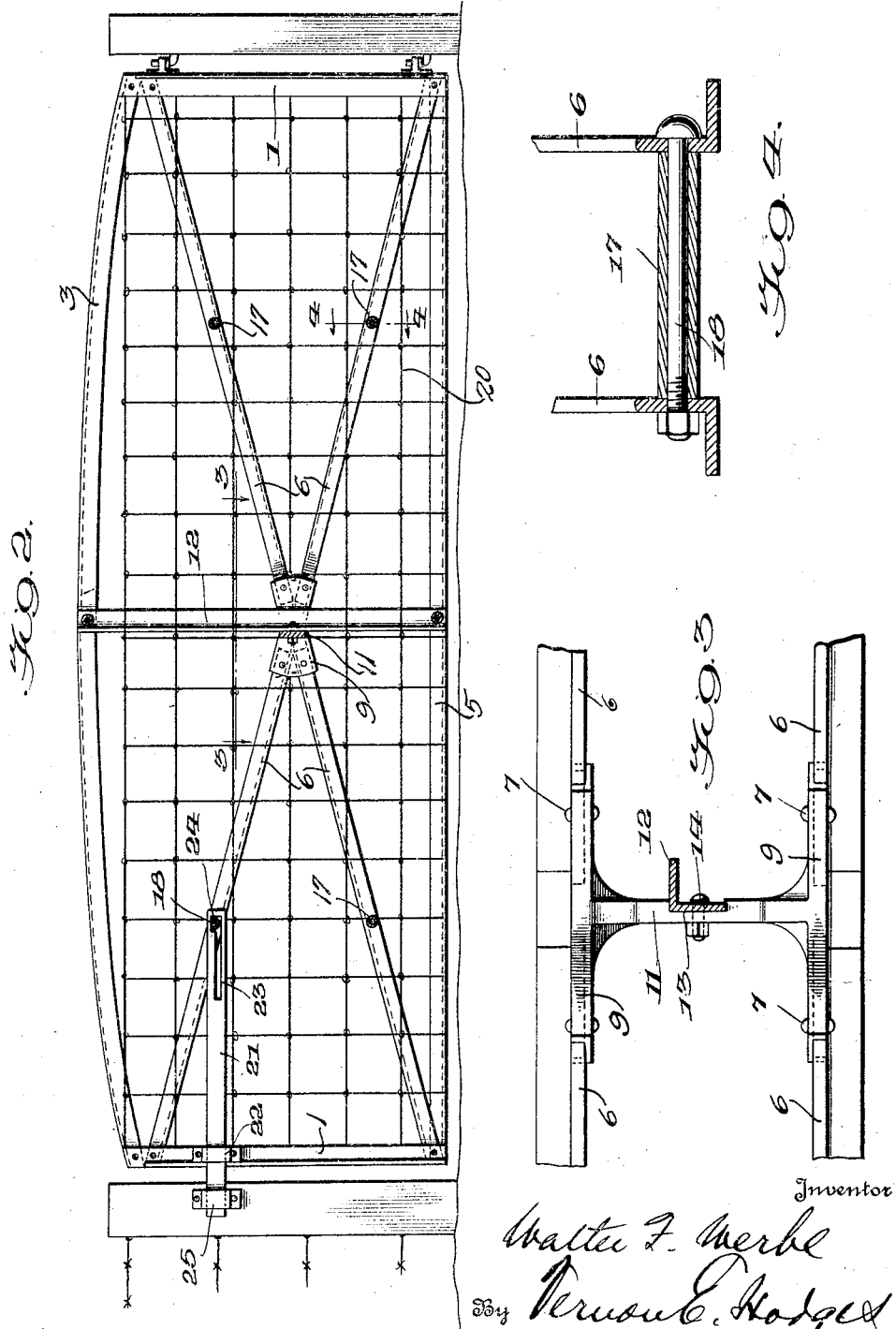

1,666,727

UNITED STATES PATENT OFFICE.

WALTER F. WERBE, OF MARTINSVILLE, INDIANA.

GATE.

Application filed April 4, 1927. Serial No. 180,881.

This invention relates to an improvement in gates.

The object of the invention is to provide an improved all-steel gate which is strong and durable and which is constructed to resist substantial wear or action by the elements of the atmosphere.

The gate is constructed of angle-iron braces extending diagonally across from the connection between the end angle-iron members and the top and bottom angle-iron truss members.

A center casting connects the diagonal braces together and with a vertical center bar which braces the gate through the middle. Fabricated wire may be woven between the angle-iron braces and truss members, if desired. A sliding latch is carried at the front end of the gate in position to lock the gate in its closed position.

This gate is thus formed to be entirely free from action by the wind, snow or rust and is so constructed that it will withstand a great amount of pressure or weight without sagging.

In the accompanying drawings:—

Fig. 1 is a perspective view of the complete gate;

Fig. 2 is a vertical longitudinal section therethrough;

Fig. 3 is a fragmentary sectional view on the line 3—3 of Fig. 2;

Fig. 4 is a detail sectional view on the line 4—4 of Fig. 2; and

Fig. 5 is a perspective view of the center casting detached

The numeral 1 indicates the end members of the braces, which are connected together at their upper ends by means of the top angle-iron truss rods 2 and 3, and have their lower ends connected together by the angle-iron truss rods 4 and 5. Diagonal angle-iron braces 6 are arranged in pairs, as shown in Fig. 1, and these terminate near the center of the gate where they are secured by bolts or rivets 7 in the grooves 8 formed in the side members 9 of the center casting 10, which side members are joined together by a web 11, as clearly shown in Figs. 3 and 5.

This casting 10 is of heavy cast-iron and serves to form a rigid support for the angle-iron braces 6. A center angle-iron brace 12 extends vertically between the top and bottom truss members 2 and 3, and 4 and 5, and this center brace 12 is secured in a groove 13 formed in the web 11 by means of a bolt 14 or some suitable fastening means. Bolts 15 extend through the upper and lower ends of this center brace 12 and spacers 16 are fitted on the bolts 15 and between the center angle-iron member 12 and the truss members 2, 3, 4 and 5, in order to hold the ends of the center brace members in their proper position with relation to the truss members. This arrangement also provides a rigid center support for the upper and lower truss members of the gate, thereby bracing both the top and the bottom of the gate to prevent small animals from pushing under it and to prevent horses or cattle from breaking it down.

The angle-iron diagonal braces 6 are held in their suitable spaced position by means of spacers 17 mounted on bolts 18 extending between the pairs of diagonal braces 6, as clearly shown in Figs. 1 and 4.

Any suitable form of hinging means may be provided for the gate, as indicated generally by the numeral 19.

Galvanized wire 20 is preferably stretched between the end members 1 of the gate in order to prevent the passage of small animals through it between the braces.

A latch 21 is slidably mounted in a guide 22 at the front end of the gate and is supported upon one of the bolts 18, which extends through a slot 23 formed in the inner end of the latch. This slot is provided with an off-set portion 24, which drops over the bolt to lock the latch against endwise movement in either direction. A suitable keeper 25 may be secured to a fence post or in any other position for receiving the end of the latch. When the off-set portion 24 of the slot 23 is dropped over the bolt 18, the latch may be moved out of the keeper 25 by lifting up the inner end of the latch and sliding the latch back, the slot 23 sliding over the bolt 18, thus allowing the gate to be opened.

It is evident that the gate thus formed is not only strong and durable but is so made that it may not be broken down nor raised up by animals, and it is entirely free from sagging.

I claim:—

1. A gate of the character described including end members, top and bottom double truss members, angle-iron braces connecting said end members together, a central brace connecting and bracing the top and bottom truss members, a center casting formed of side plates having grooves formed therein and connected together by a central web provided with a groove for receiving the central brace, and diagonal angle-iron braces fitted in the grooves in the side plates of the center casting and connected with the end members.

2. A gate of the character described including end members, top and bottom double truss members, angle-iron braces connecting said end members together, a central brace connecting and bracing the top and bottom truss members, a center casting formed of side plates having grooves formed therein and connected together by a central web provided with a groove for receiving the central brace, diagonal angle-iron braces fitted in the grooves in the side plates of the center casting and connected with the end members, and spacers for the diagonal braces and the upper and lower truss members, for holding them in their proper spaced apart position.

3. A gate including end members, top and bottom truss members connecting the end members together, an upwardly extending bracing member extending between and for bracing the top and bottom truss members, longitudinal braces connected with the gate, and a connecting casting formed of side plates connected together by a central web secured to the upwardly extending bracing member, the longitudinal braces being connected with the side plates.

4. A gate including end members, top and bottom truss members connecting the end members together, an upwardly extending bracing member extending between and for bracing the top and bottom truss members, a connecting casting formed of side plates connected together by a central web provided with a groove for receiving the upwardly extending bracing member, and longitudinal braces connected with the side plates and end members.

5. A gate including a frame having bracing members, and a connecting casting formed of side plates connected together by a central web secured to at least one of the bracing members, other of said bracing members being connected to the side plates.

In testimony whereof I affix my signature.

WALTER F. WERBE.